No. 717,414. Patented Dec. 30, 1902.
W. H. KILBOURN.
TROLLEY STAND.
(Application filed Apr. 1, 1902.)
(No Model.) 2 Sheets—Sheet 2.
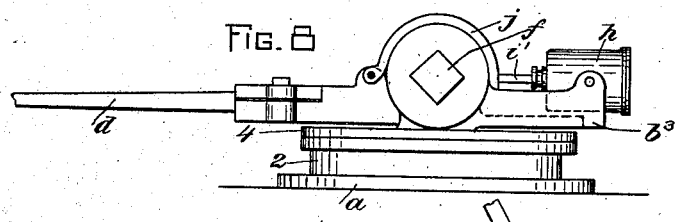
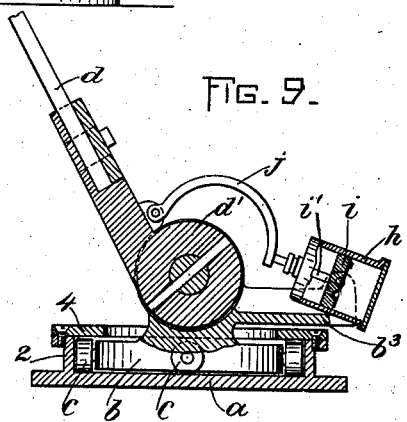
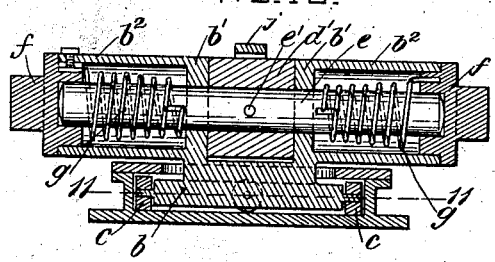
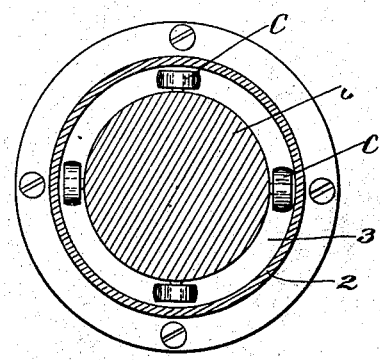
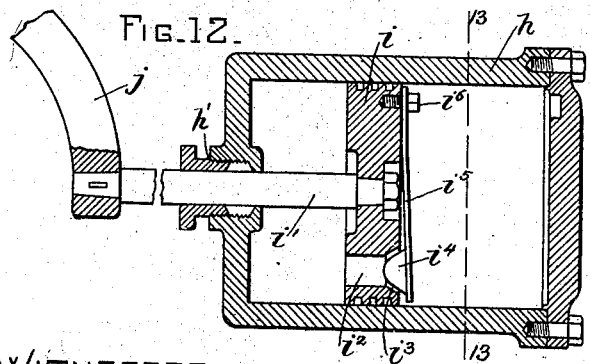
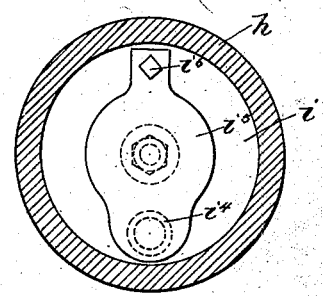
WITNESSES:
P. W. Pezzetti.
E. Batchelder
INVENTOR:
W. H. Kilbourn
by Wright Brown & Quinby
Attys.

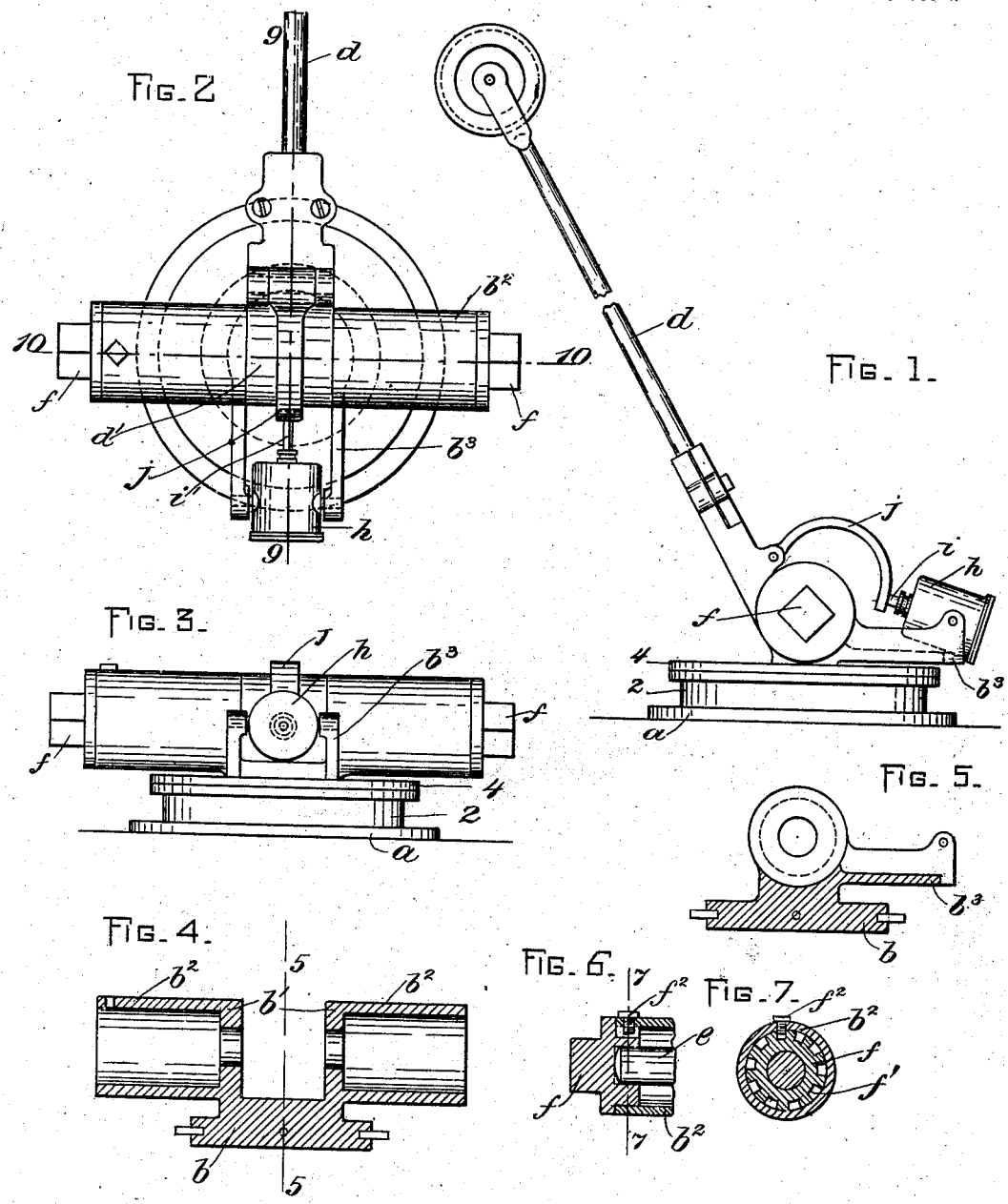

UNITED STATES PATENT OFFICE.

WASHINGTON H. KILBOURN, OF GREENFIELD, MASSACHUSETTS, ASSIGNOR TO THE STANLEY ELECTRIC MANUFACTURING COMPANY, OF PITTSFIELD, MASSACHUSETTS, A CORPORATION OF NEW JERSEY.

TROLLEY-STAND.

SPECIFICATION forming part of Letters Patent No. 717,414, dated December 30, 1902.

Application filed April 1, 1902. Serial No. 100,968. (No model.)

*To all whom it may concern:*

Be it known that I, WASHINGTON H. KILBOURN, of Greenfield, in the county of Franklin and State of Massachusetts, have invented certain new and useful Improvements in Trolley-Stands, of which the following is a specification.

This invention relates to stands or bases for trolley-arms on electric cars; and it has for its object to provide a trolley-stand which shall be simple, compact, and relatively inexpensive in construction and efficient in operation, and also to provide simple and efficient means for automatically arresting the upward movement of the trolley-arm in case said movement becomes excessively rapid, as when the trolley leaves the wire, the automatic stoppage of the arm preventing damage to cross-wires, &c., such as would be caused if the arm were allowed to swing upwardly under the full force of the springs which raise it.

The invention consists in the improvements which I will now proceed to describe and claim.

Of the accompanying drawings, forming a part of this specification, Figure 1 represents a side elevation of a trolley-stand embodying my invention, said figure showing a trolley-arm in its operative position. Fig. 2 represents a top plan view of the same. Fig. 3 represents an elevation from a different point of view from that shown in Fig. 1. Fig. 4 represents a longitudinal section of the rotary member of the trolley-stand removed from the fixed member. Fig. 5 represents a section on line 5 5 of Fig. 4. Fig. 6 represents a sectional view of a portion of the movable member. Fig. 7 represents a section on line 7 7 of Fig. 6. Fig. 8 represents a view similar to Fig. 1, showing the trolley-arm depressed. Fig. 9 represents a section on line 9 9 of Fig. 2. Fig. 10 represents a section on line 10 10 of Fig. 2. Fig. 11 represents a section on line 11 11 of Fig. 10. Fig. 12 represents an enlarged sectional view of the fluid-controlled automatic arm check or stop. Fig. 13 represents a section on line 13 13 of Fig. 12.

The same reference characters indicate the same parts in all the figures.

In the drawings, $a$ represents the fixed member of my improved trolley-stand, the same being formed for attachment to the roof of a car or to any other suitable support. The member $a$ is preferably of circular form and has a circular wall 2 projecting above its base portion, said wall and the base portion forming a circular chamber 3, Fig. 11.

$b$ represents the base portion of the movable member of the stand, said portion being formed to enter the chamber 3 and being of smaller diameter than the latter, so that an annular space is left between it and the wall 2 of the fixed member, as shown in Fig. 11.

$c$ $c$ represent antifriction-rolls mounted upon the base portion $b$ and resting upon the bottom of the chamber 3, said rolls permitting the rotation of the movable member with the minimum of frictional resistance.

4 represents an annular flange detachably secured to the wall portion 2 of the fixed member, said flange projecting inwardly far enough to cover the rolls $c$ and prevent upward displacement thereof, thus preventing the tipping of the rotary member of the stand. Said flange also forms a cover adapted to retain a body of oil in the annular space between the base portion $b$ and the wall 2, the oil thus confined lubricating the rolls and their bearings.

$b'$ $b'$ represent bearings formed on and projecting upwardly from the base portion $b$ and separated from each other by a space adapted to receive the hub $d'$ of the trolley-arm $d$. Said hub is provided with a rock-shaft $e$, which is affixed to the hub by a pin $e'$ or by any other suitable means and extends in opposite directions from the hub and through the bearings $b'$ $b'$.

$b^2$ $b^2$ represent casings formed on the bearings $b'$ $b'$ and extending outwardly therefrom in opposite directions, said casings surrounding the outer portions of the rock-shaft $e$.

$f$ $f$ represent caps secured to the outer ends of the casings $b^2$. Said caps are engaged with the outer ends of torsional springs $g$ $g$, there being two of these springs, one located at one side and the other at the opposite side of the trolley-arm hub. The inner ends of the springs $g\ g$ are engaged with the rock-shaft $e$, their outer ends being engaged, as stated, with the caps $f$, which are rigidly secured to the outer ends of the casings $b^2$, and therefore practically form parts of the rotary member of the stand. It will be seen that the springs act in unison to raise the trolley-arm and that the employment of a pair of torsional springs located at opposite sides of the trolley-arm enables the spring-pressure that is required to raise the trolley-arm to be advantageously employed and the space required for the springs to be reduced to an extremely compact form. I prefer to taper the springs $g\ g$, as shown in Fig. 10, the convolutions at the outer ends being the largest and the successive convolutions decreasing in diameter to the inner end. I find that this form of spring produces very satisfactory results, for the reason that as the spring is wound upon the shaft its effective length is reduced by the tightening of the smaller convolutions upon the shaft. The remainder of the spring will then give a quicker action to the trolley-arm. The tension of the springs $g\ g$ may be varied by partially rotating the caps $f\ f$, these caps being rotatably engaged with the casings $b^2\ b^2$ and provided with means whereby they may be secured to the casings in different positions. Said means are shown in Figs. 6 and 7 as a series of sockets $f'$, formed in the portions of the caps which are within the casings $b^2$, and set-screws $f^2$, engaged with said portions of the casings and adapted to engage the sockets $f'$.

$h$ represents a fluid-reservoir, preferably in the form of a cylinder, which is mounted upon the rotary member of the stand, said cylinder being preferably provided with trunnions, which are journaled in ears formed on an arm $b^3$, extending outwardly from the central part of the rotary member, as shown in Figs. 2 and 9. $i$ represents a piston which has a close sliding fit in the cylinder and is provided with a rod $i'$, passing through a stuffing-box $h'$ in one of the heads of the cylinder.

$j$ represents a link which connects the piston-rod $i'$ with the trolley-arm, said link being preferably curved, as shown in Figs. 1, 8, and 9. The cylinder $h$ is intended to contain any suitable fluid, which may be either gaseous or liquid. Preferably the cylinder will contain a suitable liquid, such as oil or glycerin. The piston $i$ has a passage $i^2$ extending through it from side to side to permit the passage of the fluid from one side of the piston to the other. One end of said passage is provided with a valve-seat $i^3$. $i^4$ represents a valve adapted to close said seat and to prevent the passage of fluid through the passage $i^2$. Said valve is normally held open, as shown in Fig. 12, by means of a spring-arm $i^5$, attached at $i^6$ to the piston-head, said arm being adjusted to normally stand out from the piston-head sufficiently to leave the valve open. The valve $i^4$ is adapted to yield to an increased pressure of the fluid between the piston-head and the outer end of the cylinder, so that in case the piston-head is moved abruptly in the direction toward the right in Fig. 12 the resistance of the fluid acting on the spring $i^5$ and on the valve will close the valve, and thus prevent the passage of fluid in the opposite direction through the passage $i^2$. The confined fluid will therefore act as a stop to prevent further movement of the piston in the direction indicated. The arrangement of the valve $i^4$ and spring $i^5$ is such that when the trolley-arm is pulled down from the position shown in Fig. 1 to that shown in Fig. 8 the piston will be moved toward the inner end of the cylinder, the valve yielding to permit the free passage of the fluid from the inner to the outer end of the cylinder through the piston-head. When the trolley-arm is raised at a relatively slow rate, or as it would naturally move in consequence of the undulations of the wire, the piston-head is moved at a correspondingly slow rate in the direction indicated by the arrow in Fig. 1 and does not exert sufficient pressure on the fluid between it and the outer end of the cylinder to cause said fluid to close the valve. Hence the fluid flows to the inner end of the cylinder as fast as the movement of the piston requires. If, on the other hand, the trolley-arm commences to move upwardly at a relatively rapid rate, as when the trolley-wheel accidentally leaves the wire, the increased rapidity of the movement of the piston-head increases the pressure of the fluid between it and the outer end of the cylinder, this increased pressure closing the valve $i^4$, so that the fluid stops the movement of the piston and of the trolley-arm connected therewith.

It will be seen that I have provided an automatic fluid-controlled check or stop which while permitting the necessary upward movement of the arm required in following the curves of the trolley-wire prevents any dangerous or injurious upward movement in case the trolley-wheel leaves the wire. A fluid check or stop of this character is exceedingly simple in construction, as well as durable and efficient in operation.

I do not limit myself to the particular form of fluid-controlled automatic check or stop here shown and may use any suitably-organized fluid-controlled stop for this purpose.

My invention, so far as the construction of the stand and the connection of the trolley-arm thereto is concerned, is not limited to the details of construction here shown, as the same may be variously modified. It is obvious that my improvements relating to the stand may be used independently of the improvements relating to the automatic check or stop, and vice versa, it being obvious that the stop can be used on any other suitably-constructed stand.

I claim—

1. A trolley-base comprising a fixed member, a movable member rotatably engaged with the fixed member and having shaft bearings and casings extending laterally therefrom, a trolley-arm having a rock-shaft extending through said bearings into the casings, and a pair of torsion-springs engaged with said rock-shaft and with the movable member and inclosed in said casings.

2. A trolley-base comprising a fixed member, a movable member rotatably engaged with the fixed member and having bearings and spring-holder casings located at opposite sides of a trolley-arm-receiving space, a trolley-arm having a hub portion located in said space, and a rock-shaft extending in opposite directions therefrom into said casings and engaged with said bearings, and a pair of torsional springs in said casings and engaged with said trolley-arm and casings.

3. A trolley-base comprising a fixed member, a movable member rotatably engaged with the fixed member, a trolley-arm having a rock-shaft extending from opposite sides of the arm, and a pair of torsion-springs engaged with said rock-shaft and with the movable member, said springs having convolutions which decrease in diameter from one end of the spring to the other.

4. A trolley-base comprising a fixed member, a rotatable member having bearings separated by a trolley-arm-receiving space, casings extending outwardly from said bearings, and caps at the outer ends of said casings, a trolley-arm having a hub portion located in said space, and a rock-shaft extending in opposite directions from said hub and engaged with said bearings, and a pair of torsional springs contained in said casings and engaged with the said rock-shaft and with the caps.

5. A trolley-base comprising a fixed member, a rotatable member having bearings separated by a trolley-arm-receiving space, casings extending outwardly from said bearings, and caps at the outer ends of said casings, a trolley-arm having a hub portion located in said space, and a rock-shaft extending in opposite directions from said hub and engaged with said bearings, and a pair of torsional springs contained in said casings and engaged with the said rock-shaft and with the caps, the caps being rotatably connected with the casings to permit the adjustment of the springs and provided with means whereby they may be secured in different positions.

6. The combination of a trolley-base, a trolley-arm pivoted thereto, means for imparting a yielding upward movement to the arm, a fluid-reservoir, a movable abutment therein connected with the trolley-arm, means for permitting movement of a fluid from one side of the abutment to the other to permit a relatively slow movement of the arm and abutment, and an automatic device operated by a relatively rapid movement of the arm to prevent said movement of the fluid and stop the arm.

7. The combination of a trolley-base, a trolley-arm pivoted thereto, means for imparting a yielding upward movement to the arm, a cylinder mounted on the trolley-base, a piston in said cylinder connected with the trolley-arm, the said piston having a fluid-passage extending through it, and a valve adapted to close said passage, said valve being provided with means whereby it is held open when the fluid-pressure is normal, and is closed by an increase of fluid-pressure.

In testimony whereof I have affixed my signature in presence of two witnesses.

WASHINGTON H. KILBOURN.

Witnesses:
C. F. BROWN,
E. BATCHELDER.